United States Patent
Moisan et al.

(10) Patent No.: US 8,438,264 B2
(45) Date of Patent: May 7, 2013

(54) METHOD AND APPARATUS FOR COLLECTING, ANALYZING, AND PRESENTING DATA IN A COMMUNICATION NETWORK

(75) Inventors: Kevin James Moisan, Castro Valley, CA (US); Juan Carlos Martinez, Danville, CA (US); Michael Tisiker, Westland, MI (US); Dick Khan, San Ramon, CA (US); Amit Rele, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1320 days.

(21) Appl. No.: 11/024,540

(22) Filed: Dec. 28, 2004

(65) Prior Publication Data

US 2006/0142001 A1  Jun. 29, 2006

(51) Int. Cl.
*G06F 15/173* (2006.01)

(52) U.S. Cl.
USPC ........................................................ 709/224

(58) Field of Classification Search ................. 709/223, 709/224
See application file for complete search history.

(56) References Cited

U.S. PATENT DOCUMENTS

| | | | |
|---|---|---|---|
| 5,974,237 A | 10/1999 | Shurmer et al. | |
| 6,205,413 B1 | 3/2001 | Bisdikian et al. | |
| 6,253,239 B1 * | 6/2001 | Shklar et al. | 709/217 |
| 6,260,062 B1 | 7/2001 | Davis et al. | |
| 6,269,401 B1 | 7/2001 | Fletcher et al. | |
| 6,473,407 B1 | 10/2002 | Ditmer et al. | |
| 6,510,454 B1 | 1/2003 | Walukiewicz | |
| 6,557,036 B1 | 4/2003 | Kavacheri et al. | |
| 6,625,648 B1 | 9/2003 | Schwaller et al. | |
| 6,678,250 B1 | 1/2004 | Grabelsky et al. | |
| 6,718,384 B2 | 4/2004 | Linzy | |
| 6,725,268 B1 | 4/2004 | Jackel et al. | |
| 6,816,898 B1 * | 11/2004 | Garg et al. | 709/224 |
| 7,668,855 B2 * | 2/2010 | Hodgson et al. | 707/999.102 |
| 7,693,042 B1 * | 4/2010 | Wei | 370/216 |
| 2001/0046230 A1 | 11/2001 | Rojas | |
| 2001/0052087 A1 | 12/2001 | Garg et al. | |
| 2002/0004390 A1 | 1/2002 | Cutaia et al. | |
| 2002/0091815 A1 | 7/2002 | Anderson et al. | |
| 2003/0079107 A1 * | 4/2003 | Booth et al. | 712/1 |
| 2003/0120775 A1 | 6/2003 | York | |
| 2004/0158633 A1 * | 8/2004 | Ahoor et al. | 709/224 |
| 2004/0177002 A1 * | 9/2004 | Abelow | 705/14 |
| 2005/0022156 A1 * | 1/2005 | Schwan et al. | 717/102 |
| 2005/0071457 A1 * | 3/2005 | Yang-Huffman et al. | 709/224 |
| 2005/0204028 A1 * | 9/2005 | Bahl et al. | 709/223 |

* cited by examiner

*Primary Examiner* — Jeong S Park
(74) *Attorney, Agent, or Firm* — Hanley, Flight & Zimmerman, LLC

(57) ABSTRACT

Methods and apparatus for monitoring a communication network are disclosed. A disclosed method of monitoring a communication network periodically collects data from a plurality of network elements within the communication network. The disclosed method analyzes the collected data in accordance with a rule that corresponds to a characteristic of performance or capacity of the plurality of network elements to form performance or capacity data representative of a user experience of the communication network. The disclosed method then presents the performance or capacity data via a web browser using a plurality of view levels and types.

30 Claims, 10 Drawing Sheets

| SBC View | | | |
|---|---|---|---|
| Download | Legend | | |
| Region | Number of Switches | % Util Yellow | % Util Red |
| SBC-East | 0 | 0 | 0 |
| SBC-Midwest | 10 | 1 | 1 |
| SBC-Southwest | 0 | 0 | 0 |
| SBC-West | 15 | 2 | 1 |
| | | | |
| Total | 25 | 3 | 2 |

FIG. 4

| Region View | | | Region: SBC-West | |
|---|---|---|---|---|
| Download | Legend | | | |
| Region | Number of Gateways | Number PRI Ports | Number 10/100 Ports | % CPU Util Yellow |
| Nevada | 0 | | | |
| North | 0 | | | |
| Bay Area | 0 | | | |
| Los Angeles | 15 | 220 | 42 | |
| | | | | |
| Total for Region | 15 | 220 | 42 | |

FIG. 5

| Market View | | Region: SBC-West | | | | |
|---|---|---|---|---|---|---|
| | | Market: Bay Area | | | | |
| | | | | | | |
| Download | Legend | | | | | |
| Switch Name | Gateway Type | Terminating PRI | Ports | Total 10/100 Ports | # Ports in Yellow/Red Utilization | # Ports in Yellow/Red Discards or Errors |
| OWENS | 3550 | 12 | 28 | | 0/0 | 0/0 |
| PLTNCA13 | 7609 | 18 | 28 | 5/24 | 0/0 | 0/0 |
| SYCAMORE-12G | 3550-12G | 23 | 28 | | 0/0 | 0/0 |

FIG. 6

| Gateway 'n' | IP Address | Access Server Name | Access Server Part Number | Software Release Levels | Installed Interface Cards by Card Type | Card Status for each Card | Port Status for Each Port |
|---|---|---|---|---|---|---|---|
| 0:00 | | | | | | | |
| 1:00 | | | | | | | |
| 2:00 | | | | | | | |
| 3:00 | | | | | | | |
| 4:00 | | | | | | | |
| . | | | | | | | |
| . | | | | | | | |
| . | | | | | | | |
| 23:00 | | | | | | | |

FIG. 7

| MWA Export | | | | | | | | | | |
|---|---|---|---|---|---|---|---|---|---|---|
| Date & Time | LDAP Search | LDAP Mod. | LDAP Add | LDAP Delete | LDAP Error | LDAP Bind Success | LDAP Bind Failure | Total LDAP Ops | IMAP Create Success | IMAP Create Error |
| 9/25 15:05:07 | 44 | 2 | 0 | 0 | 0 | 3 | 0 | 49 | 0 | 0 |
| 9/25 15:20:08 | 45 | 3 | 0 | 0 | 0 | 3 | 0 | 48 | 0 | 0 |
| 9/25 15:35:07 | 45 | 3 | 0 | 0 | 0 | 3 | 0 | 48 | 0 | 0 |
| 9/25 15:50:07 | 45 | 3 | 0 | 0 | 0 | 3 | 0 | 48 | 0 | 0 |
| 9/25 16:05:07 | 46 | 3 | 0 | 0 | 0 | 3 | 0 | 49 | 0 | 0 |
| 9/25 16:20:07 | 45 | 3 | 0 | 0 | 0 | 3 | 0 | 48 | 0 | 0 |

FIG. 8

| Date & Time | Connect (ms) | Bind (ms) | Search (ms) | Unbind (ms) | Transaction (ms) |
|---|---|---|---|---|---|
| 10/17 16:02 | 0 | 0 | 0 | 0 | 0 |
| 10/17 16:17 | 0 | 0 | 10 | 0 | 10 |
| 10/17 16:32 | 0 | 10 | 10 | 0 | 20 |
| 10/17 16:47 | 10 | 10 | 10 | 0 | 30 |
| 10/17 17:02 | 0 | 10 | 10 | 0 | 20 |
| 10/17 17:17 | 10 | 0 | 10 | 0 | 20 |
| 10/17 17:32 | 0 | 50 | 20 | 0 | 70 |

FIG. 9

Web Interface Logon Transaction

| Click on the reported value to go to a detailed *application* view | | Peak Daily 15 Minutes for All Servers in the Cluster | | | | | | |
|---|---|---|---|---|---|---|---|---|
| | | Web Server Application A | | | Access Server Application B | Directory Server Application D | Message Server Application C (if used) | Network 1 | Network 2 |
| Day | Date | total web interface logon | time taken to connect to the server | time taken to return the long-on screen | time taken to log a customer and to display the home page | total transaction time | total transaction time | total transaction time | total transport time | total transport time |
| SUN | 12/5/2004 | 1560 | 10 | 100 | 1450 | 600 | 500 | 350 | 2 | 3 |
| MON | 12/6/2004 | 1640 | 10 | 30 | 1600 | 600 | 900 | 100 | 4 | 6 |
| TUE | 12/7/2004 | 3500 | 500 | 300 | 2700 | 2100 | 400 | 200 | 5 | 4 |
| WED | 12/8/2004 | 1925 | 15 | 210 | 1700 | 1100 | 300 | 300 | 3 | 3 |
| THU | 12/9/2004 | 1925 | 25 | 250 | 1650 | 1200 | 200 | 250 | 7 | 5 |
| FRI | 12/10/2004 | 2140 | 30 | 210 | 1900 | 1100 | 600 | 200 | 6 | 5 |
| SAT | 12/11/2004 | 1720 | 20 | 50 | 1650 | 500 | 1000 | 150 | 4 | 4 |

⋯⋯ = warning threshold

▬ = action threshold

FIG. 10

METHOD AND APPARATUS FOR COLLECTING, ANALYZING, AND PRESENTING DATA IN A COMMUNICATION NETWORK

FIELD OF THE DISCLOSURE

The present disclosure relates generally to communication networks and, more specifically, to methods and apparatus for monitoring a communication network.

BACKGROUND

Communication networks such as, for example, public switched telephone networks, mobile phone networks, computer networks, etc. typically include a variety of node equipment (e.g., switches, servers, routers, computer terminals or interfaces, etc.) and link equipment (e.g., cabling, wireless transmission apparatus, etc.) Some communication networks include a monitoring system that enables a system operator or other designated personnel to monitor the operation of individual network elements such as node equipment and/or link equipment to troubleshoot and/or maintain the equipment.

Some known communication network monitoring systems or tools (e.g., software-based tools) collect information relating to the operational condition of individual network elements (e.g., node and/or link equipment components) using a data collection system (e.g., a server coupled to a database). Typically, the data collection system periodically polls individual network elements for operational information and/or receives messages containing operational information from the network elements. Such operational information is usually associated with operational faults, imminent operational problems, and/or other operational characteristics associated with the individual network elements.

Many known communication network monitoring systems or tools also provide one or more graphical interfaces or displays that enable system operators or other designated personnel to view the current operational conditions of individual network elements. Such graphical displays may include visual and/or audible alarm indicators to draw an operator's attention to network elements that have failed and/or which have reached an operationally problematic condition and, thus, may require service, replacement, reconfiguration, etc.

Generally, known communication network monitoring systems or tools typically only provide current operational information associated with individual network elements. As a result, a system operator can only understand end-to-end or end user or customer experience (e.g., perceived performance) of the communication network by attempting to mentally analyze, interrelate, and/or aggregate a relatively large amount of operational information associated with the individual network elements. Of course, the task of mentally analyzing such a large amount of operational information is difficult, if not impossible, for a system operator to accomplish. Further, even if system operators could somehow manage to mentally analyze such a large amount of operational information to glean end-to-end performance data therefrom, each system operator may perform such an analysis in a different manner, thereby leading to inconsistent results.

Many known communication network monitoring systems or tools are operationally focused and, as a result, typically only provide operational information related to individual network elements. Accordingly, many known communication network monitoring systems are well-suited to facilitate the maintenance of a given communication system topology, infrastructure, design, etc., but are not typically adapted to facilitate the correction of poor user experience or performance perception of the communication network and/or improvement of user experience or perception of communication network performance.

The monitoring of communication networks has become increasingly more difficult due to the increasing complexity and integration of communication services. Such integrated services typically involve heterogeneous networks including equipment associated with multiple vendors and/or services. For example, one well-known integrated heterogeneous communication network provides integrated electronic mail and voice services. The monitoring of such an integrated communication network is complicated by the large number and diversity of network elements composing the network. Likewise, a system operator's ability to determine (e.g., via mental analysis) end-to-end performance characteristics (e.g., characteristics of the communication network that are indicative of a user's experience or performance perception of the network) is greatly diminished, or completely prohibited, due to the increased diversity and complexity of such integrated communication networks.

BRIEF DESCRIPTION OF THE DRAWINGS

FIGS. 4-12 depict example presentations or views that may be provided by the example system and method of FIGS. 2 and 3.

DETAILED DESCRIPTION

Figure 1:
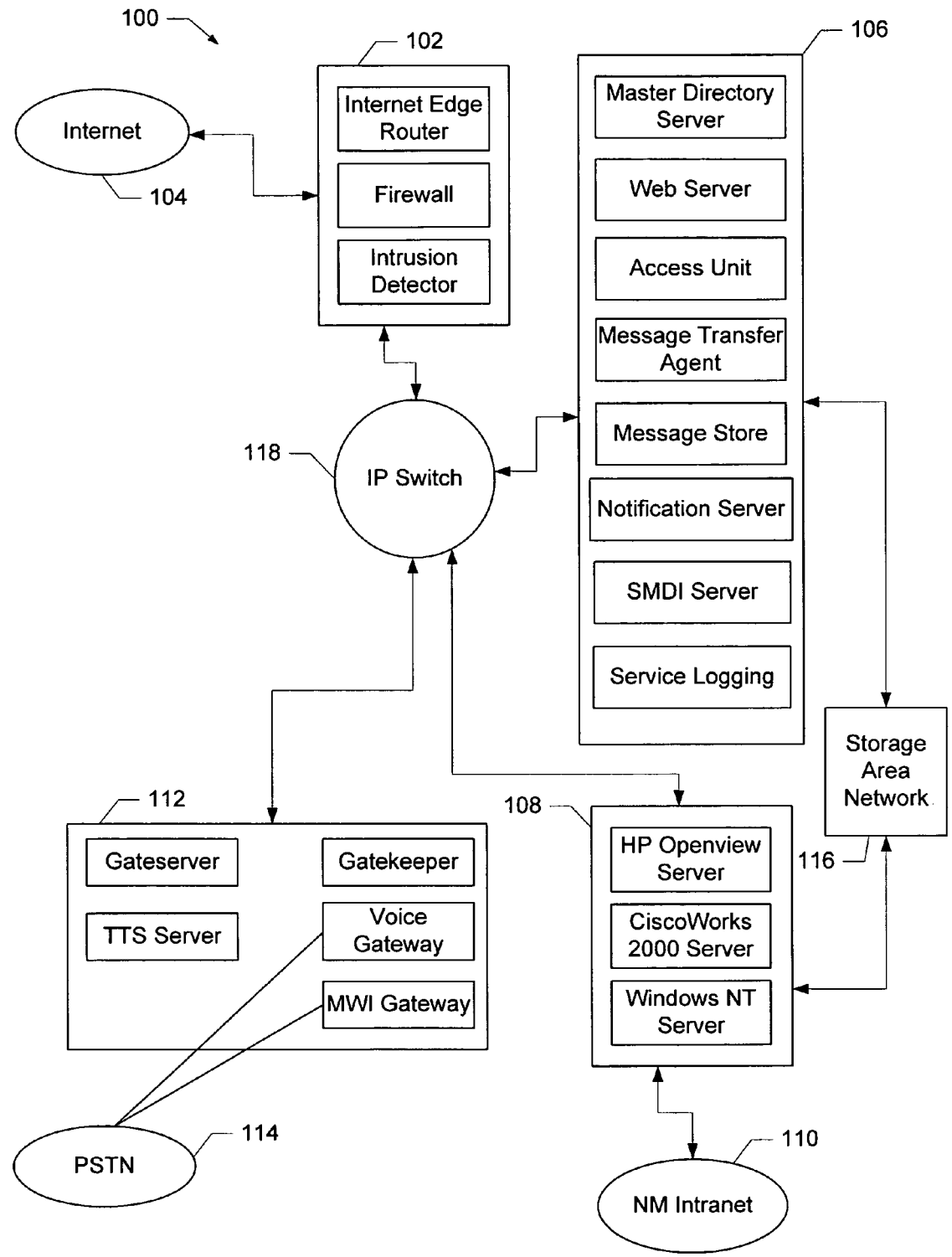
FIG. 1 depicts an example prior art communication network having integrated voice and electronic mail services with which the example monitoring methods and apparatus described herein may be implemented.

In general, the example monitoring methods and apparatus described herein enable personnel responsible for the maintenance and engineering of a communication network to intuitively view capacity-related and/or performance-related characteristics of the communication network as a whole, and to view performance and/or capacity information associated with the elements or components composing the communication network. More specifically, the example monitoring methods and apparatus described herein automatically periodically collect capacity-related and/or performance-related information from the network elements or components composing the communication network. In an example described herein, the communication network is a heterogeneous, multi-vendor communication network that integrates voice and electronic mail or messaging services. However, the example monitoring methods and apparatus described herein could alternatively or additionally be applied to other types of communication networks, including fewer or more services and/or different types of communication services than those specifically described herein.

Regardless of the particular numbers and/or types of services provided by the communication network to which the example methods and apparatus described herein are applied, the periodically collected capacity and/or performance information associated with the individual network elements is collected and stored in a common database. The collected capacity and/or performance information is then analyzed using rules or business objects, one or more of which may correspond to a performance-related or capacity-related characteristic of the communication network. One or more of the performance-related or capacity-related characteristics preferably corresponds to an end user or customer perception or experience of the service(s) provided via the communication network. Other ones of the rules or business objects may correspond to problematic conditions, one or more of which may generate an alarm or alert condition to be communicated to appropriate personnel in one or more desired manners (e.g., via e-mail, pager, cellular phone, etc.)

In contrast to some known communication network monitoring apparatus and methods, the example monitoring apparatus and methods described herein generate performance and capacity information related to the manner in which users experience or perceive the performance of the communication network. In other words, the example methods and apparatus described herein provide end-to-end performance-related information that may be used by system operators and/or other personnel (e.g., system engineers) to achieve improved end user or customer experience or perception of the communication network. In this manner, the example monitoring methods and apparatus described herein may function as an engineering tool for identifying possible network architecture or infrastructure enhancements as opposed to merely an operational or maintenance tool focused on service restoration.

To facilitate the ease with which system operators (e.g., system engineers, technicians, etc.) can find and assimilate the capacity-related and performance-related information provided by the example monitoring apparatus and methods described herein, the example monitoring apparatus and methods may also provide a network-based (e.g., web or Internet-based) graphical user interface. In particular, an example graphical user interface may provide a plurality of hierarchically interrelated system views or presentations, ranging from high level rolled up (e.g., aggregated) system level views corresponding to relatively large geographic service regions or areas, to low level views of individual switches and/or other network elements or devices. One or more high level system views or presentations may contain capacity-related and/or performance-related information (e.g., values, textual messages, etc.) associated with end-to-end or user perceived characteristics of the service(s) provided by the communication network. Such high level system views or presentations can provide a holistic or synthesized view of the level or quality of service (e.g., the quality of voice paths, memory being used, capacity available per subscriber, etc.) provided to communication network end users or customers. Such synthesized or holistic views or presentations may be particularly advantageous in situations where the communication network integrates different types of and/or different vendors' communication equipment (e.g., a system that integrates voice and electronic mail services).

FIG. 1 depicts an example known communication network 100 providing integrated voice and electronic mail services with which the example monitoring methods and apparatus described herein may be implemented. The example communication network 100 of FIG. 1 uses an architecture that is typical of a communication system that provides integrated voice and electronic mail services. The example communication network 100 of FIG. 1 is composed of several major subsystems and/or component groups (i.e., groups of network elements). In particular, the example network 100 includes an Internet access component group 102 that is communicatively coupled to the Internet 104, a mail server component group 106, a network management group 108 that is communicatively coupled to a network management intranet 110, a voice call component group 112 that is communicatively coupled to a public switched telephone network (PSTN) 114, and a storage component group 116 that is utilized by the mail server component group 106 and the network management group 108. As is depicted in FIG. 1, communications between the component groups 102, 106, 108, and 112 is enabled by an Internet protocol (IP) switch 118. The IP switch 118 is configured in a known manner to route IP packets based on destination address information contained within IP encapsulated data packets sent by the various component groups 102, 106, 108, and 112 to the IP switch 118.

The component groups 102, 106, 108, 112, and 116 shown within the example communication network 100 of FIG. 1 are well-known in connection with communication networks providing integrated voice and electronic mail services. Accordingly, the individual sub-components shown within each of the component groups 102, 106, 108, and 112, as well as the manner in which the component groups 102, 106, 108, 112, and 116 function and interoperate with each other, are not described in further detail herein. Rather, the example communication network 100 is merely provided as one example of a communication network architecture having integrated communication services to which the example monitoring apparatus methods described herein may be advantageously applied.

Figure 2:
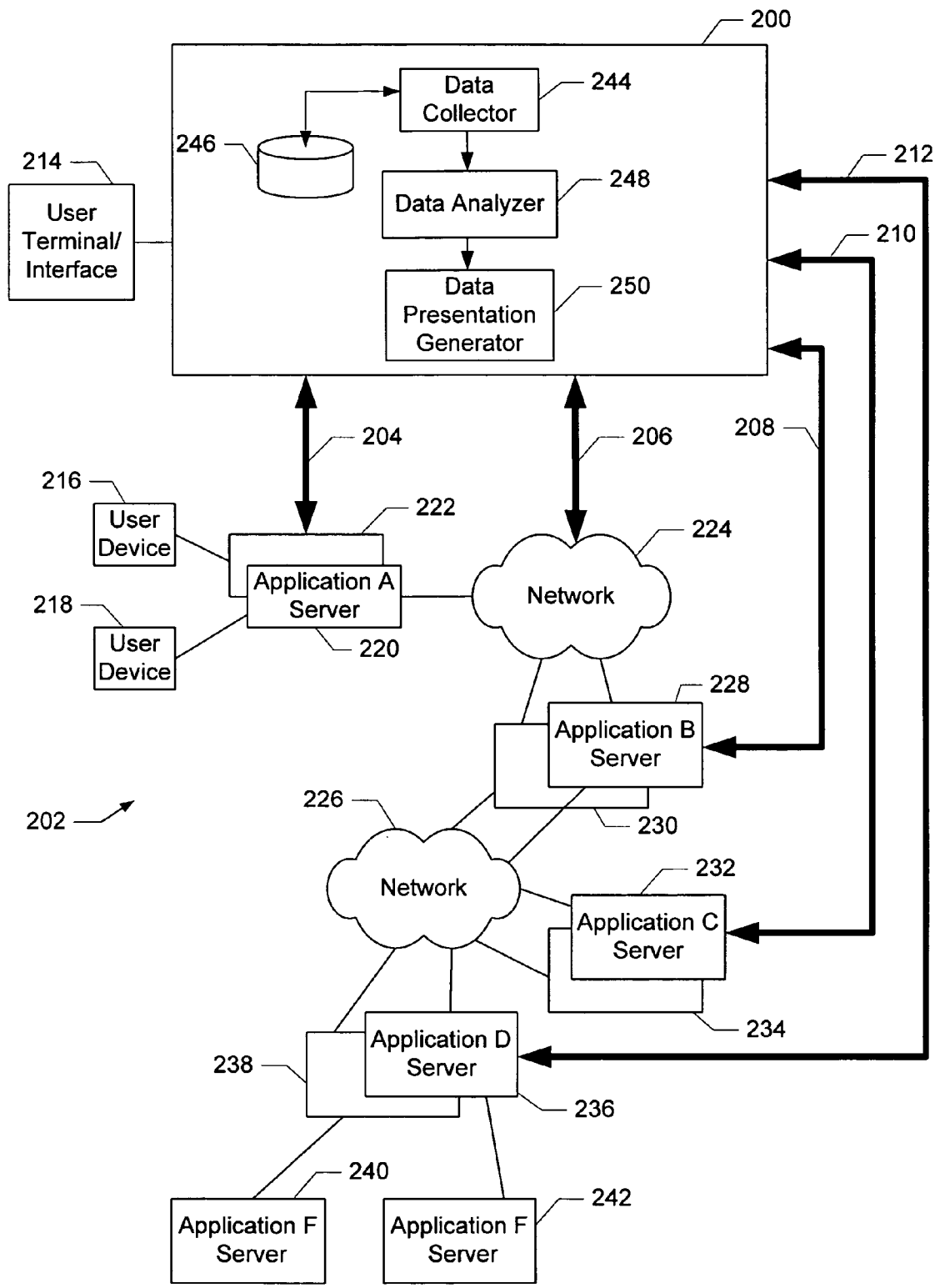
FIG. 2 is block diagram of an example system that may be used to monitor the example communication network of FIG. 1.

FIG. 2 is a more generalized block diagram depicting an example manner in which the example monitoring apparatus and methods described herein may be applied. The more generalized diagram of FIG. 2 is provided to facilitate an understanding of the manner in which the example monitoring apparatus and methods described herein may be applied to a known communication network such as the example network 100 shown in FIG. 1.

As shown generally in FIG. 2, a monitoring apparatus 200 is communicatively coupled to a communication network 202 via a plurality of communication links 204, 206, 208, 210, and 212. In general, as described in greater detail below, the monitoring apparatus 200 is configured to automatically collect capacity-related and/or performance-related data from the network 202. The monitoring apparatus 200 analyzes the collected data to provide capacity-related and/or performance-related information, at least some of which is representative of the manner in which a user (e.g., an end user) experiences or perceives the operation of the network 202. In some examples, the communication network 202 could be the example network 100 (FIG. 1), which provides integrated voice and electronic mail services or, alternatively, could be any other communication network. Additionally, a user terminal/interface 214 may be coupled to the monitoring apparatus 200 to enable a system operator or other personnel to view information (e.g., capacity and/or performance-related information) and/or interact with the monitoring apparatus 200 and the network 202.

Turning in detail to FIG. 2, the communication network 202 may enable a plurality of user devices 216, 218 to communicate with the network 202 via one or more servers 220, 222, each of which may be executing an appropriate communications application (labeled as "Application A" in FIG. 2). The user devices 216, 218 may be laptop computers, personal data assistants, desktop computers, and/or or any other device (s) or combination of devices capable of engaging in electronic communications with a server. The user devices 216, 218 may engage in communications with the network 202 using any combination of hardwired or wireless communication platform and/or protocols including, for example, those commonly employed with cellular communications, satellite communications, public switched telephone networks, packet-switched networks, etc. In some examples, one or more of the user devices 216, 218 are web-enabled devices that communicate via the Internet with the servers 220, 222.

The servers 220, 222 are coupled to a network 224, which may be a packet switched network, or any other suitable network. The network 224 may be further coupled to another network 226 via a second set of servers 228, 230, which may be configured similarly to the Internet component access group 102 (FIG. 1). The second set of servers 228, 230 execute a second application (labeled as "Application B") to provide communicative access to the network 226. As shown in FIG. 2, a third set of servers 232, 234, a fourth set of servers 236, 238, and a fifth sets of servers 240, 242 are communicatively coupled via the network 226. In some examples, the third set of servers 232, 234 may be configured to execute, for example, a message serving application (labeled as "Application C"), the fourth set of servers 236, 238 may be configured to execute, for example, a directory server application (labeled as "Application D"), and the fifth set of servers 240, 242 may be configured to execute, for example, a notification server (labeled as "Application F"). In some examples, the third, fourth, and fifth sets of servers 232, 234, 236, 238, and 240, 242 may perform functions similar or identical to those performed by the mail server component group 106 (FIG. 1).

As shown in FIG. 2, the monitoring apparatus 200 is communicatively coupled to the first set of servers 220, 222 via the link 204, the network 224 via the link 206, the second set of servers 228, 230 via the link 208, the third set of servers 232, 234 via the link 210, and the fourth and fifth sets of servers 236, 238 and 240, 242 via the link 212. While the links 204, 206, 208, 210, and 212 are depicted in FIG. 2 as separate links, the links 204-212 may be implemented using any combination of hardwired and wireless communications. In one example, one or more of the links 204-212 may be formed exclusively or at least partially through a packet-switched network such as the Internet. Alternatively or additionally, the one or more of the links 204-212 may be dedicated or non-shared communication links. Regardless of the manner in which the communication links 204-212 are implemented, the monitoring apparatus 200 is configured to communicate (e.g., collect data from) the various network elements (e.g., the servers 220, 222, 228, 230, 232, 234, 236, 238, 240, and 244 and the networks 224 and 226) within the communication network 202.

The example monitoring apparatus 200 includes a data collector 244 for periodically collecting capacity-related and/or performance-related information from the communication network 202, which may be in some examples the example integrated voice and electronic mail communication network 100 of FIG. 1. The example data collector 244 may be further coupled to a database 246 configured to enable the data collector 244 to store and/or retrieve the collected capacity-related and performance-related information therein.

A data analyzer 248 for analyzing some or all of the capacity-related and performance-related information collected by the data collector 244 is coupled to the data collector 244. As described in greater detail below, the data analyzer 248 is configured to apply one or more rules or business objects to analyze or otherwise process the information collected by the data collector 244. One or more of the rules or business objects may be configured to analyze the collected information to generate performance-related and/or capacity-related information representative of the manner in which end users or customers experience or perceive the quality of service(s) provided by the communication network 202. For example, the data analyzer 248 is configured to analyze capacity and/or performance information from a variety of network elements (which may be associated with different vendors and/or different types of communication services such as electronic mail and voice services) to develop or generate metrics representative of end users' or customers' experiences or perceptions of the performance of the communication network 202. More particularly, the information generated by the data analyzer 248 may be representative of a user experience of a user-initiated communication within the communication network 202 involving a plurality of network elements such as, for example, one or more of the servers 220, 222, 228, 230, 232, 234, 236, 238, 240, and 242 and or the networks 224 and 226.

As is depicted in FIG. 2, a data presentation generator 250 is coupled to the data analyzer 248. As described in greater detail below, the data presentation generator 250 is configured to organize and graphically present capacity and/or performance information associated with the communication network 202 using hierarchically interrelated displays, views, or presentations. Examples of such presentations or displays are described in greater detail below in connection with FIGS. 4-12.

The user terminal/interface 214 is configured to receive inputs, commands, etc. from and/or display performance-related and/or capacity-related information to a system operator or other personnel. As depicted in FIG. 2, the user terminal/interface 214 is coupled to the monitoring apparatus 200 and, in particular, the data presentation generator 250. In the case where the example monitoring apparatus 200 is implemented in conjunction with the example communication network 100 of FIG. 1, the user terminal 214 may be communicatively coupled to the data presentation generator 250 via the network management intranet 110 (FIG. 1) and/or via the Internet 104 and the Internet access component group 102. Additionally, the user terminal 214 may be implemented using any desired processor-based system or the like such as the example processor-based system 1302 described in connection with FIG. 13 below.

Continuing with the above example, the data collector 244, the data analyzer 248, and/or the data presentation generator 250 may be implemented within the network management component group 108 (FIG. 1). In particular, one or more of the servers shown within the network management group 108 may be programmed or configured to perform the operations shown and described in connection with the monitoring process of FIG. 3. Further, the database 246 may be implemented using the storage area network 116 (FIG. 1).

In such an example, a system operator or other personnel may be able to better assess the quality of service provided to end users or customers by the example communication network 100. In particular, information associated with the performance and/or capacity of the groups 102, 106, 108, and 112 as well as the various switches, routers, servers, etc. making up the PSTN 114 and/or the Internet 104 may be collected, analyzed, and presented to the system operator and/or other personnel. In turn, the system operator and/or other personnel may use the performance-related and/or capacity-related information to improve the level or quality of service provided by the network 100 via changes or modifications to the architecture, infrastructure, equipment, etc. of the network 100.

Figure 3:
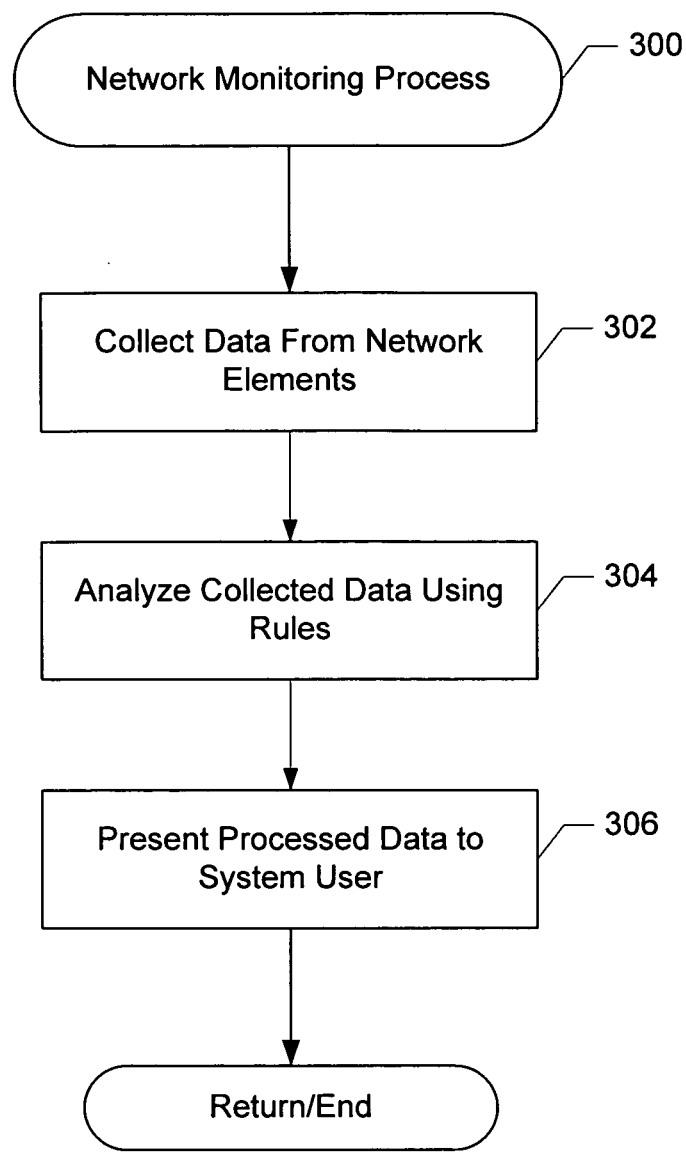
FIG. 3 is a flow diagram depicting an example communication network monitoring process that may be implemented by the example system of FIG. 2.

FIG. 3 is a flow diagram depicting an example communication network monitoring process 300 that may be implemented by the example monitoring apparatus 200 of FIG. 2.

In operation, the data collector 244 (FIG. 2) automatically periodically collects data or information from the network elements composing the communication network 202 (block 302). The frequency at which the data collector 244 collects information or data from the various elements composing the network 202 may vary based on the desired level of detail needed to properly assess performance and/or capacity of the communication network 202, the type of information or data being collected, or may vary in any other desired manner. For example, some information or data such as configuration information may be collected relatively infrequently. In one example, the data collector 244 may collect configuration data from the various network elements composing the network 202 on a weekly basis. In this manner, the monitoring apparatus 200 can automatically accurately determine or inventory the elements of the network 202. Thus, the monitoring apparatus or system 200 can automatically discover any changes to the architecture, topology, infrastructure, devices, components, etc. of the communication network 202, thereby eliminating the need for engineering personnel or other personnel to enter such changes using error-prone manual data entry techniques.

Data collected at block 302 by the data collector 244 (FIG. 2) is analyzed using rules (e.g., business and/or presentation rules or objects) (block 304) by the data analyzer 248 (FIG. 2). In contrast to many known communication network monitoring systems, the analysis of the collected data at block 304 synthesizes capacity-related and/or performance-related information or data from a plurality of network elements to provide metrics that are representative of end users' (e.g., customers') perception or experience of the quality or characteristics of the service(s) provided by the communication network 202 (FIG. 2). More specifically, the analysis at block 304 can synthesize data from a plurality of individual network components, subsystems, etc., some or all of which may be associated with different services and/or vendors, to provide a substantially holistic view of the characteristics of the communication network 202 (FIG. 2). Thus, in some examples, the data analyzer 248 (FIG. 2) is configured to analyze a variety of collected data types and formats at block 304. For example, the data analysis at block 304 may process or synthesize a variety of message sets such as, for example, SNMP messages, TL1 messages, etc., that employ a variety of protocols (e.g., http, LDAP, IMAP, SMTP, POP, etc.) to provide a seamless or coherent view of the communication network 202 (FIG. 2).

The rules applied to the collected data at block 304 may be configured to characterize or synthesize the data in any desired manner. For example, the rules applied at block 304 may characterize collected data to define the number of ports in service, customer transaction times, and/or any other characteristics that may be representative of end users' perception or experience of the service(s) provided by the network 204 (FIG. 2). Also, for example, the rules applied at block 304 may use thresholds that correspond to certain equipment configurations, traffic throughput levels, certain performance numbers, etc. Rules utilizing such thresholds may be customized or may otherwise correspond to particular users or types of users. For example, a system planner may desire to know when a gateway element has reached fifty percent of its capacity to provide sufficient time to obtain additional or different equipment to handle an increasing demand on that gateway element. On the other hand, a system engineer may desire to know when that same gateway element has reached ninety percent of its capacity to study its performance. Thus, a variety of performance-related and/or capacity-related metrics can be generated at block 304 based on the needs of different users of the monitoring apparatus 200 (FIG. 2), the characteristics of the communication network 202 to which the monitoring apparatus 200 is applied, etc. Example metrics that may be generated at block 304 for a gateway element are shown in TABLE 1 below.

TABLE 1

GATEWAY METRICS

IP Address
Access server name
Access server part number
Software release level
Installed interface cards by card type
Card status for each card
Port status for each port
Termination attempts for each DS0
Termination attempts rejected by the gatekeeper for each DS0 because of insufficient bandwidth availability
Termination attempts rejected by the gatekeeper for each DS0 because of unavailable TUI resources
Termination attempts rejected by the gatekeeper for each DS0 for any reason other than insufficient bandwidth or unavailable TUI resources
Terminations answered for each DS0
Start time for each call on each DS0
End time for each call on each DS0
Termination attempts for each hunt group
Termination attempts rejected by the gatekeeper for each hunt group
Terminations answered for each hunt group
Number of trunks in each hunt group
Available CCS capacity for each hunt group
CCS usage for each hunt group
Percent CCS utilization for each hunt group
Average hold time for each hunt group
Number of users assigned to each hunt group
Blocked calls for each hunt group
Average CPU utilization
Peak CPU utilization
CPU utilization threshold crossing counts
Peak CPU utilization threshold crossing counts
Memory utilization
Number of RTP packets received by the access server
Number of RTP packets sent by the TUI
Lost packet count
Average inter-arrival jitter from the TUI to the access server
Peak inter-arrival jitter from the TUI to the access server
Average roundtrip packet delay
Peak roundtrip packet delay Of course, the example gateway metrics shown in TABLE 1 above are merely examples of the types of metrics that may be produced by the data analysis at block 304. Other metrics for other types of communication network elements can be produced in a similar manner.

The results of the data analysis at block 304 may be presented to a system user or other personnel via a graphical user interface (block 306). Example presentations or graphical views are shown in FIGS. 4-12. In general, the presentation operation at block 306 is implemented using a web browser that enables the system operator or other designated personnel to easily navigate through a variety of view levels and types. The view levels correspond to different organizational level views and, thus, range from company level views of the communication network 202 (FIG. 2) to views associated with a specific port of a specific network element.

Within each view level, one or more view types are provided so that data associated with that view level may be viewed in different manners. For example, at a company level, a system user may desire to view the total number of network elements deployed, the total number of customer accounts, the total number of outages, transaction times experienced by end users or customers, etc. All such data types may be viewed at a different level such as, for example, for a particular network element, for a particular distribution area, etc. and/or may be viewed for different services provided by the communication network 202 (e.g., voice access, data access, etc.)

FIGS. 4-12 depict example presentations or views that may be provided by the example apparatus and method of FIGS. 2 and 3. In particular, FIGS. 4-6 depict an example of hierarchically interrelated view levels. Specifically, FIG. 4 is an example company level view, FIG. 5 is a regional view (i.e., the SBC West region), and FIG. 6 is a market view (i.e., the Bay Area within the SBC West region). As shown in the example views or presentations of FIGS. 4-6, numbers of switches, percent utilization metrics, numbers of ports, etc. may be provided so that a system user or operator can perform capacity planning activities and, if needed, identify network/architecture or infrastructure enhancements to improve end users' or customers' experiences or perceptions of the level or quality of the service(s) provided by the communication network 202 (FIG. 2).

Additionally or alternatively, the presentation of data at block 306 can include notifications, alerts, and/or alarms. Such notifications, alerts, and/or alarms may be sent to system operators or other designated personnel via electronic mail and/or may be incorporated in the presentation views (e.g., the presentation views of FIGS. 4-9) as textual and/or graphical (e.g., color coded) visual indicators. For example, the analysis at block 304 may determine when a metric has exceeded or fallen below a predetermined threshold (e.g., a bandwidth utilization level, port exhaust, real-time exhaust, quality of service, etc.) and generate an appropriate notification, alert, or alarm to be presented to one or more designated system operators or other personnel.

FIGS. 7-9 are example component level views that may be provided at block 306. In particular, FIG. 7 is an example remote gateway view, FIG. 8 is an example directory server view, and FIG. 9 is an example web server access view. Of course, additional views associated with any other components within the communication network 202 (FIG. 2) can be provided at block 306 (FIG. 3).

FIG. 10 is an example view that may be provided to a system user (e.g., network personnel) via the user terminal/interface 214 (FIG. 2). In particular, FIG. 10 depicts an example presentation of performance information related to log-in transaction execution times. The information within the example presentation of FIG. 10 may be collected and/or generated in connection with the example communication network 202 and monitoring apparatus 200 of FIG. 2. For example, end users may log-on via one of the user devices 216, 218 to check for text or image messages, voice messages, etc. stored within the communication network 202. Such log-on activity may invoke actions on or within one or more of the servers 220, 222, 228, 230, 236, 238, 240, 242 and/or one or more of the networks 224 and 226. As described above in connection with FIG. 3, the monitoring apparatus 200 (FIG. 2) periodically collects performance-related (e.g., transaction times, elapsed times, failure rates, transaction volume, etc.) information from the various elements composing the network 202 (FIG. 2), analyzes the collected data, and presents the data (e.g., via the example presentation of FIG. 10) to a user (e.g., network personnel).

Turning in detail to the example presentation of FIG. 10, peak transaction times (e.g., measured across the entire system or end-to-end) related to end user log-on activity are shown for fifteen minute intervals over a one week period. Starting with the leftmost column, the days of the week are listed, followed in the next column by the calendar date. The next four columns (i.e., the third through the sixth columns) include transaction times associated with the servers 220, 222 (i.e., the cluster of servers) executing Application A (e.g., a web server application). The seventh column includes transaction times associated with the servers 228, 230 executing Application B (e.g., an access server application), the eighth column includes transaction times associated with the servers 236, 238 executing Application D (e.g., a directory server application), and the ninth column includes transaction times associated with the servers 232, 234 executing Application D (e.g., a message server application). The tenth and eleventh columns include transaction times (e.g., transport times) associated with networks 224 and 226, respectively.

As can be seen in FIG. 10, the transaction time information in the third column reflects the total log-on time, which may be representative of customer experience or perception of performance of the network 202 (FIG. 2). The remaining columns (i.e., columns 4 through 11) show the transaction time contributions of the various elements of the network 202 to the total transaction times in the third column. Further, the transaction time information shown in the example presentation of FIG. 10 may be representative of one or more maximum transaction times associated with one or more individual customers or, alternatively, may represent an average maximum customer experience during days of the week for a given interval (e.g., 5 minutes, 15 minutes, 1 hour, etc.)

As is depicted in the example presentation of FIG. 10, one or more cells, each of which contains transaction time information, may be indicated using a surrounding distinctive border. However, any other indication such as distinctive shading, color, etc. could be used instead of or in addition to the distinctive border. In any case, the indication(s) may identify those cells containing transaction time information that has exceeded or fallen below a threshold value associated with a warning condition in which action by a user or other personnel may be not necessary. Alternatively or additionally, the indication(s) may identify those cells containing transaction time information that has exceeded or fallen below a threshold value associated with an action threshold (i.e., a condition under which action by a user or other personnel is advisable or required). In some examples, a user can select a cell value to obtain further detail associated with that cell value. For instance, selecting a cell value having an indication corresponding to a condition where the cell value has exceeded or fallen below a warning or action threshold may provide further data or information relating to individual devices (e.g., servers), networks, applications, etc. that affect the cell value. For example, component views such as those example views depicted in FIGS. 7-9 may be provided. Alternatively or additionally, information associated with selected time intervals (e.g., smaller time intervals) may be provided.

Figure 11:
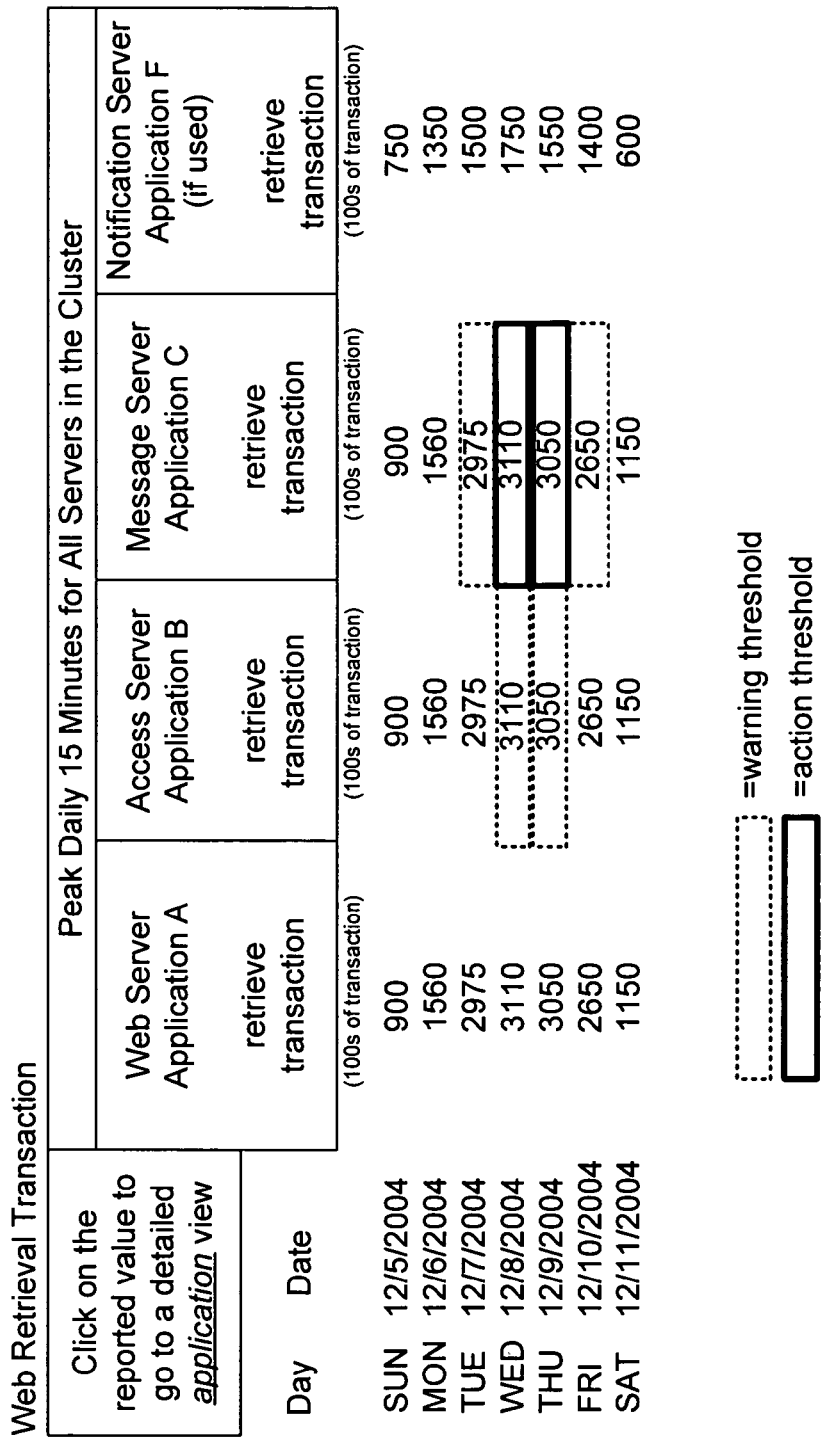

FIG. 11 depicts an example presentation containing information or data relating to information retrieval transaction volumes. In other words, end users of the example network 202 may log-on and retrieve voice, image, and/or text messages, thereby impacting the volume of transactions managed by the network 202.

Figure 12:
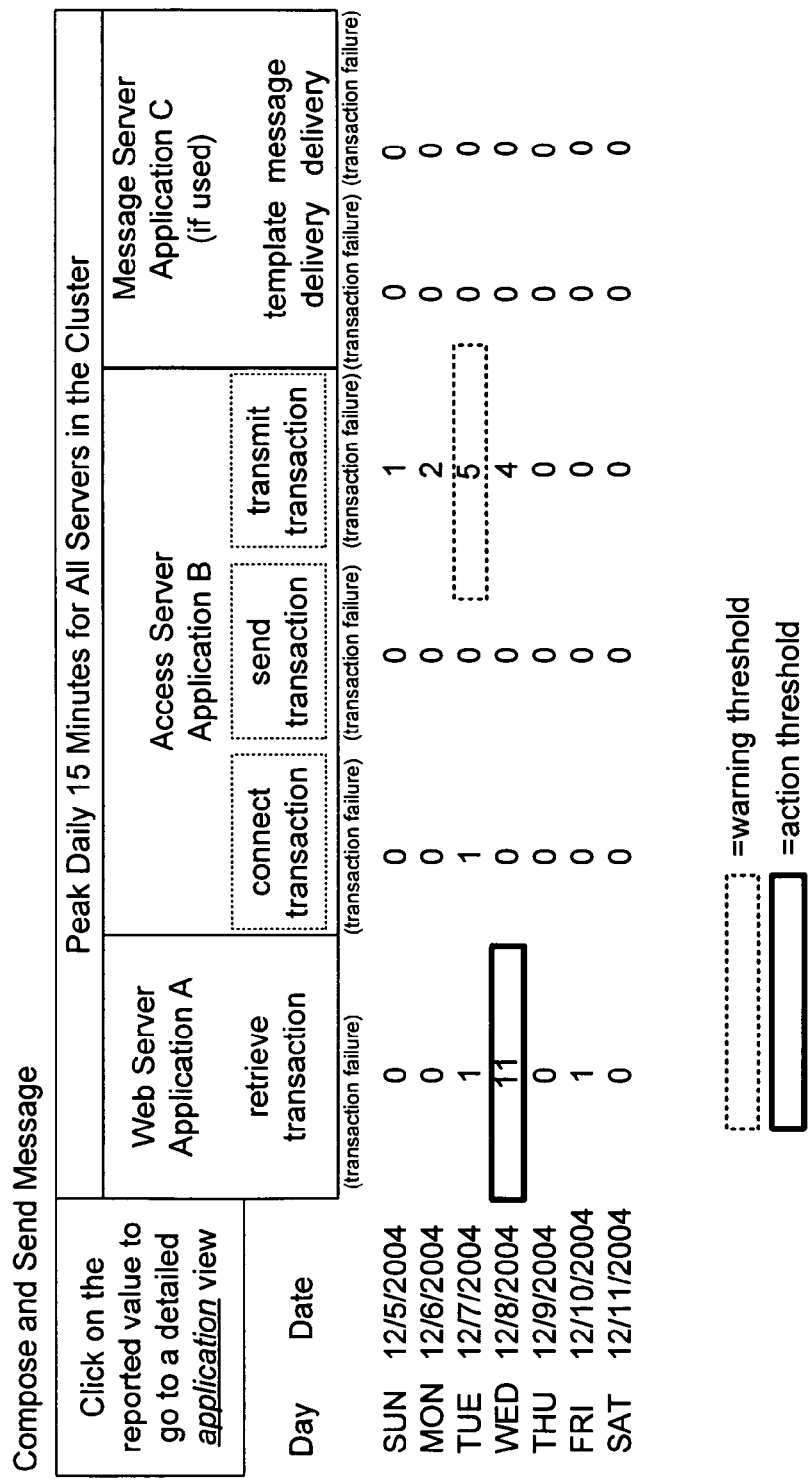

FIG. 12 depicts an example presentation containing information or data (e.g., measured across the entire system or end-to-end) relating to failed message compositions. Thus, the example presentation of FIG. 12 provides a user or other personnel a way of identifying when, how often, and where transaction failures occur within the example communication network 202.

Figure 13:
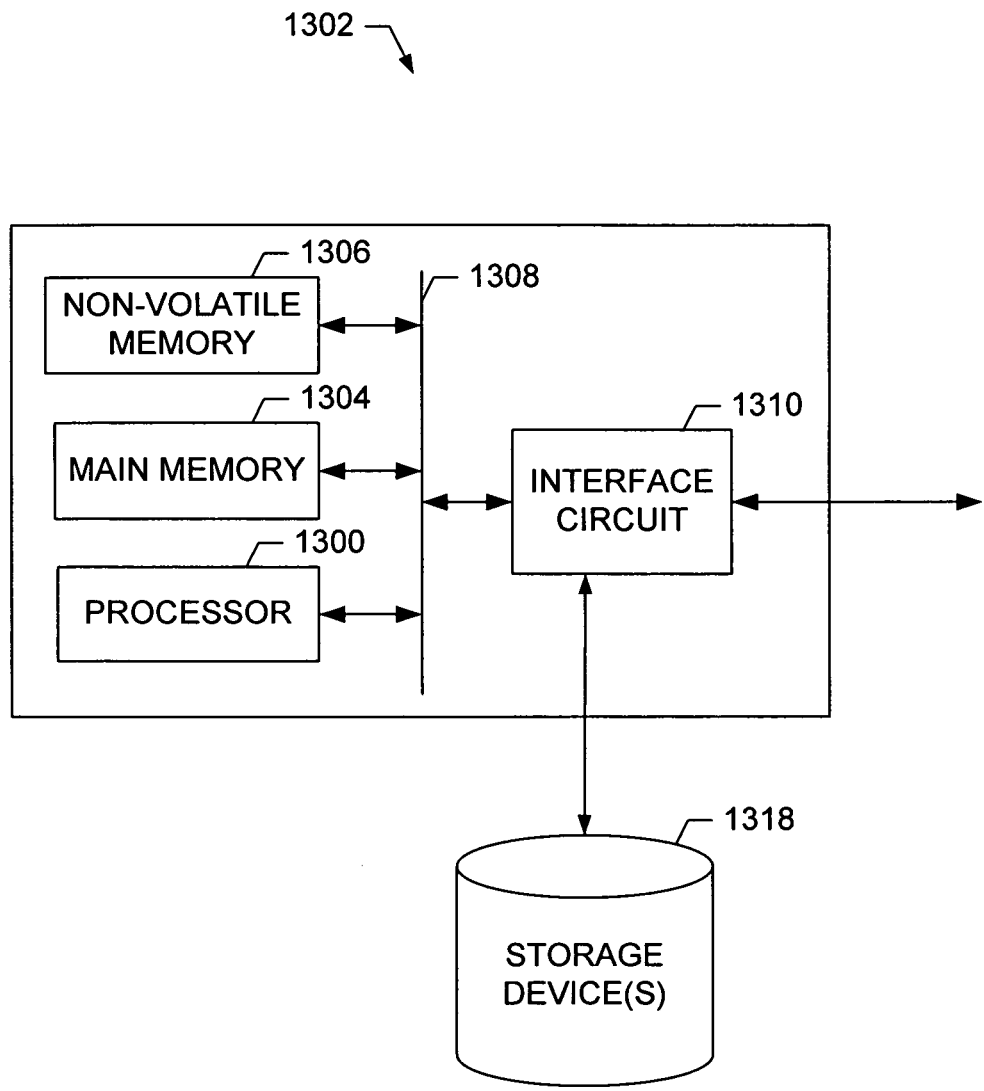
FIG. 13 is an example processor-based system that may be used to implement the example system of FIG. 2.

FIG. 13 depicts an example processor system 1302 that may be used to implement, for example, the data collector 244, the data analyzer 248, the data presentation generator 250 and/or the user terminal/interface 214 shown in FIG. 2.

The example processor-based system 1302 may be, for example, a server, a personal computer, or any other type of computing device.

The processor 1300 may, for example, be implemented using one or more Intel® microprocessors from the Pentium® family, the Itanium® family or the XScale® family. Of course, other processors from other families are also appropriate. The processor 1300 is in communication with a main memory including a volatile memory 1304 and a non-volatile memory 1306 via a bus 1308. The volatile memory 1304 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1306 may be implemented by flash memory and/or any other desired type of memory device. Access to the memory 1304 is typically controlled by a memory controller (not shown) in a conventional manner.

The system 1302 also includes an interface circuit 1310. The interface circuit 1310 may be implemented by any type of well-known interface standard to, for example, enable the system 1302 to communicate with the communication network 202 (FIG. 2).

The system 1302 also includes one or more mass storage devices 1318 for storing software and/or data. Examples of such mass storage devices include floppy disk drives, hard drive disks, compact disk drives and digital versatile disk (DVD) drives.

While the foregoing examples have been described in connection with the collection and analysis of actual user data, it should be recognized that the example methods and apparatus and methods can similarly be advantageously applied to performance and capacity-related data resulting from the use of communication network test probes and/or traffic generators.

As can be appreciated from the foregoing description, the example monitoring apparatus and methods described herein enable engineering data or information (e.g., capacity-related data, performance-related data, etc.) to be automatically periodically acquired from each of the elements composing a communication network. The communication network may be composed of equipment from multiple vendors and/or service providers. In some examples, the communication network provides integrated voice and electronic mail services.

The collected data is then analyzed, synthesized, or otherwise processed according to rules (e.g., business rules) to generate information associated with the end-to-end performance of the communication network. Some of the information generated represents end users' or customers' perception(s) or experience(s) of the service(s) provided by the communication network. Thus, in contrast to many known communication network monitoring systems, the example monitoring apparatus and methods described herein may be used to identify potential network enhancements to further improve the quality of service as perceived by end users or customers, rather than merely providing troubleshooting and/or service restoration information.

The example monitoring apparatus and methods described herein further provide graphical (e.g., via a web-based tool) presentations to facilitate a system operator's ability to intuitively assimilate the results of the data analysis. With the graphical presentations, the system operator can quickly navigate through a plurality of hierarchically interrelated views corresponding to different levels of the communication network (e.g., company wide, regional, market, etc.) and/or within levels can view different types of information (gateway utilization, customer transaction times, number switches deployed, etc.) The graphical presentations facilitate the correlation of service performance with equipment capacity metrics, which may indicate where changes to network infrastructure (i.e., additional or different network elements) may be needed to meet expected or improve service levels.

Although certain methods, apparatus, and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of monitoring a communication network, comprising:

collecting data from a plurality of network elements within the communication network;

storing the collected data in a computer-readable storage;

analyzing the collected data to form performance data representative of a user experience of a user-initiated communication within the communication network involving the plurality of network elements, the performance data comprising a quality of a voice path;

presenting the performance data in a plurality of hierarchically interrelated tabular views corresponding to a plurality of geographic network service area levels, wherein each of the tabular views presents performance data metrics representative of a respective one of the geographic network service area levels;

receiving a selection of a first performance data metric presented in a first tabular view corresponding to a first geographic network service area level; and presenting a second performance data metric in a second tabular view corresponding to a second geographic network service area level in response to the selection, the first geographic network service area level representing a first geographic area, the second geographic network service area level representing a second geographic area smaller than the first geographic network service area, and the second performance data metric being presented based on the selected first performance data metric.

2. A method as defined in claim 1, wherein periodically collecting the data from the plurality of network elements includes automatically discovering the presence of at least one of the network elements.

3. A method as defined in claim 1, wherein periodically collecting the data from the plurality of network elements includes collecting portions of the data at different rates.

4. A method as defined in claim 1, wherein periodically collecting the data from the plurality of network elements includes storing the data in a common database.

5. A method as defined in claim 1, wherein analyzing the collected data includes comparing at least some of the collected data to a threshold value representative of a level of service within the communication network.

6. A method as defined in claim 5, further comprising generating an alert based on the comparison of the at least some of the collected data to the threshold value.

7. A method as defined in claim 1, wherein analyzing the collected data includes interrelating data associated with multiple ones of the network elements.

8. A method as defined in claim 1, wherein analyzing the collected data includes using a presentation or business rule to analyze the collected data.

9. A method as defined in claim 1, wherein the performance data representative of the user experience of the communication network is associated with an end-to-end performance characteristic of the communication network.

10. A method as defined in claim 1, wherein the plurality of network elements includes network elements from different vendors, each of which provides a different communication service via the communication network.

11. A method as defined in claim 1, wherein the communication network is an Internet protocol-based integrated voice and electronic mail system.

12. A method as defined in claim 1, further comprising identifying potential network enhancements based on the performance data.

13. A method as defined in claim 1, wherein the performance metrics comprise at least one of a number of real-time transport protocol packets received by an access server, a number of real-time transport protocol packets sent by a telephony user interface, a lost packet count, an average inter-arrival jitter from a telephony user interface to an access server, or a peak inter-arrival jitter from a telephony user interface to an access server.

14. An apparatus for monitoring a communication network, comprising:
a data collector to collect data from a plurality of network elements within the communication network;
a data analyzer in communication with the data collector to analyze the collected data to form performance data representative of a user experience of a user-initiated communication within the communication network involving the plurality of network elements, the performance data comprising a quality of a voice path; and
a data presentation generator in communication with the data analyzer, the data presentation generator to:
generate one or more presentations containing the performance data in a plurality of hierarchically interrelated tabular views corresponding to respective ones of a plurality of geographic network service area levels, each of the tabular views to present performance data metrics representative of the respective one of the geographic network service area levels;
receive a selection of a first performance data metric presented in a first tabular view at a first geographic network service area level; and
present a second performance data metric in a second tabular view at a second geographic network service area level in response to the selection, the first geographic network service area level representing a first geographic area, the second geographic network service area level representing a second geographic area smaller than the first geographic network service area, and the second performance data metric being presented based on the selected first performance data metric, wherein at least the data analyzer is implemented using a processor.

15. An apparatus as defined in claim 14, wherein the data collector is to periodically collect the data from the plurality of network elements by discovering the presence of at least one of the network elements.

16. An apparatus as defined in claim 14, wherein the data collector is to periodically collect the data from the plurality of network elements by collecting portions of the data at different rates.

17. An apparatus as defined in claim 14, wherein the data analyzer is to analyze the collected data by comparing at least some of the collected data to a threshold value representative of a level of service within the communication network.

18. An apparatus as defined in claim 14, wherein the data analyzer is to analyze the collected data by interrelating data associated with multiple ones of the network elements.

19. An apparatus as defined in claim 14, wherein the performance data representative of the user experience of the communication network is associated with an end-to-end performance characteristic of the communication network.

20. An apparatus as defined in claim 14, wherein the communication network is an Internet protocol-based integrated voice and electronic mail system.

21. A tangible machine accessible medium excluding propagating signals, the tangible medium having instructions stored thereon that, when executed, cause a machine to perform a method comprising:
collecting data from a plurality of network elements within a communication network;
analyzing the collected data to form performance data representative of a user experience of a user-initiated communication within the communication network involving the plurality of network elements, the performance data comprising a quality of a voice path;
presenting the performance data in a plurality of hierarchically interrelated tabular views corresponding to a plurality of geographic network service area levels, each of the tabular views to present performance data metrics representative of the respective one of the geographic network service area levels; and
receiving a selection of a first performance data metric presented in a first tabular view at a first geographic network service area level, by presenting a second performance data metric in a second tabular view at a second geographic network service area level, the first geographic network service area level representing a first geographic area, the second geographic network service area level representing a second geographic area smaller than the first geographic network service area, and the second performance data metric being presented based on the selected first performance data metric.

22. A machine accessible medium as defined in claim 21 wherein the instructions further cause the machine to periodically collect the data from the plurality of network elements by discovering the presence of at least one of the network elements.

23. A machine accessible medium as defined in claim 21 wherein the instructions further cause the machine to periodically collect the data from the plurality of network elements by collecting portions of the data at different rates.

24. A machine accessible medium as defined in claim 21 wherein the instructions further cause the machine to periodically collect the data from the plurality of network elements by storing the data in a common database.

25. A machine accessible medium as defined in claim 21 wherein the instructions further cause the machine to analyze the collected data by comparing at least some of the collected data to a threshold value representative of a level of service within the communication network.

26. A machine accessible medium as defined in claim 25 wherein the instructions further cause the machine to generate an alert based on the comparison of the at least some of the collected data to the threshold value.

27. A machine accessible medium as defined in claim 21 wherein the instructions further cause the machine to analyze the collected data by interrelating data associated with multiple ones of the network elements.

28. A machine accessible medium as defined in claim 21 wherein the instructions further cause the machine to analyze the collected data by using a presentation or business rule to analyze the collected data.

29. A machine accessible medium as defined in claim 21, wherein the performance data representative of the user experience of the communication network is associated with an end-to-end performance characteristic of the communication network.

30. A machine accessible medium as defined in claim 21 wherein the instructions further cause the machine to identify potential network enhancements based on the performance data.

* * * * *